(12) United States Patent
Moreira et al.

(10) Patent No.: US 8,075,793 B2
(45) Date of Patent: Dec. 13, 2011

(54) PROCESS FOR PREPARING MAGNETIC GRAPHITIC MATERIALS, AND MATERIALS THEREOF

(75) Inventors: Fernando Manuel Araújo Moreira, São Carlos-SP (BR); Helena Pardo Minetti, Montevideo (UY); Álvaro Washington Mombrú Rodriguez, Montevideo (UY)

(73) Assignee: Universidade Federal De Sao Carlos (UY)

( * ) Notice: Subject to any disclaimer, the term of this patent is extended or adjusted under 35 U.S.C. 154(b) by 1102 days.

(21) Appl. No.: 11/570,593

(22) PCT Filed: Jun. 15, 2005

(86) PCT No.: PCT/BR2005/000110
§ 371 (c)(1),
(2), (4) Date: Oct. 5, 2007

(87) PCT Pub. No.: WO2005/123580
PCT Pub. Date: Dec. 29, 2005

(65) Prior Publication Data
US 2008/0237533 A1 Oct. 2, 2008

(30) Foreign Application Priority Data
Jun. 16, 2004 (BR) .................................. 0402338

(51) Int. Cl.
*H01F 1/00* (2006.01)
*C01B 31/04* (2006.01)
*C09C 1/56* (2006.01)

(52) U.S. Cl. ............... 252/62.51 R; 423/448; 423/460

(58) Field of Classification Search ............ 423/448, 423/460; 252/62.51 R, 62.55, 502
See application file for complete search history.

(56) References Cited

OTHER PUBLICATIONS

Host, et al., Effect of annealing on the structure and magnetic properties of graphite encapsulated nickel and cobalt nanocrystals, J. Appl. Phys. 1998; 83(2): 793-801.*
Esquinazi, et al., Magnetic carbon: explicit evidence of ferromagnetism induced by proton irradiation, Carbon 2004; 42: 1213-1217.*
Kajii, et al., Electronic energy state of a periodic porous nanoscale graphite, J. Phys. D: Appl. Phys. 2000; 33: 3146-3151.*
Mombrú et al., "Multilevel ferromagnetic behavior of room-temperature bulk magnetic graphite," *Physical Review*, vol. 71, No. 10, Mar. 1, 2005; pp. 100404-1-100404-4.
Esquinazi et al., "Magnetic carbon: explicit evidence of ferromagnetism induced by proton irradiation", *Carbon Elsevier UK*, vol. 42, No. 7; Feb. 10, 2004; pp. 1213-1217. Takai et al., "Structure and electronic properties of a nongraphitic disordered carbon system and its heat-treatment effects," *Physical Review B*, vol. 67, No. 21; Jun. 1, 2003; pp. 214202-1-214202-11.
Kopelevich et al., "Ferromagnetic- and Superconducting-Like Behavior of Graphite," *Journal of Low Temperature Physics*, vol. 119, No. 5-6, Jun. 2000, pp. 691-702.
Search Report and Written Opinion for PCT/BR2005/000110 dated Aug. 24, 2005.

* cited by examiner

*Primary Examiner* — Daniel C. McCracken
(74) *Attorney, Agent, or Firm* — Alston & Bird LLP (57) ABSTRACT

A process of preparing magnetic graphitic materials from graphite in a second container (3) that reacts with one of more transition metal oxide and in a first container (2) at a volume ratio of 1:1, in a closed reactor (1), heated up to a temperature between 600° C. and the melting temperature of the transition oxide (s) for 6 to 36 hours, under a pressure of 10 atmospheres with the help of a transfer inert gas through an inlet (5) and vacuum between $10^{-2}$ torr to $10^{-7}$ torr through an outlet (6), obtaining at the end of the process a graphitic material with long-lasting magnetic properties at room temperature. The material obtained exhibits a complex structure, with pores, bunches, pilings and edges of exposed graphenes and finds application in nanotechnology, magnetic images in medical science, applications in communication, electronics, sensors, even biosensors, catalysis or separation of magnetic materials.

13 Claims, 6 Drawing Sheets

PROCESS FOR PREPARING MAGNETIC GRAPHITIC MATERIALS, AND MATERIALS THEREOF

CROSS-REFERENCE TO RELATED APPLICATIONS

This application is a national stage entry of PCT/BR05/000110 filed on Jun. 15, 2005.

This application claims priority of Brazilian patent application No. PI0402338-2, the disclosure thereof being hereby incorporated by reference.

The present invention relates to the field of magnetic graphitic materials, more specifically, to processes of preparing nanostructural materials from commercial pure graphite and transition metal oxides in an inert atmosphere or vacuum and under heating.

BACKGROUND OF THE INVENTION

Nanostructural carbonous materials are being the focus of attention of research, due to the potential commercial applications and the novelty of their physical properties. The possibility of achieving properties of interest in macroscopic samples of carbon—such as long-lasting magnetic properties at room temperature—open a plethora of applications.

These materials may be used in magnetic imaging in medicine, or else applied in nanotechnology, communications, electronics, sensors, even biosensors, catalysis or separation of magnetic materials. However, for many years, the existence of pure carbon materials that could exhibit this type of property was difficult to believe.

Existing processes that lead to the obtainment of microscopic amounts of magnetic carbon use nuclear techniques (proton bombardment) or conditions of extreme temperature and pressure that make them unfeasible from the point of view of economy. In addition, they do not lead to materials having applicable ferromagnetic behavior when compared with the background magnetic signal (which, in general, is strongly diamagnetic).

In spite of the efforts for achieving magnetism in organic materials, very few systems proved to have this property. In the last few years, with the discovery of new allotropic forms of carbon, this field of research has been reviewed by the discovery of ferromagnetism in the charge transfer salt [TDAE]-$C_{60}$ and in polymerized fullerene, as cited by P. M. Allemand et al, *Science* 253, 301 (1991), T. Makarova et al., *Nature* 413, 716 (2001) and R. A. Wood et al., J. Phys.: *Condens. Matter* 14, L385 (2002).

In addition, some papers show the existence of magnetization loops of the ferromagnetic type in highly oriented pyrolytic graphite (HOPG), as cited by Y. Kopelevich, P. Esquinazi, J. H. S. Torres, S. Moethlecke, J. *Low Temp. Phys.* 119, 691 (2000) and P. Esquinazi et al., *Phys. REv.* B 66, 24429 (2002).

Recently, two important papers showed, in a not ambiguous way, that the existence of ferromagnetism in pure carbon is possible. One of these papers, by P. Turek et al, *Chem. Phys. Lett.* 180, 327 (1991) reports the induction of magnetic orderings by proton irradiation on HOPG. This material shows magnetic ordering stable at room temperature.

Another paper reports the synthesis of a new allotropic form of carbon, a nanofoam totally consisting of carbon, which exhibits a behavior of the ferromagnetic type up to 90K, with a narrow hysteresis curve and high saturation magnetization, see A. V. Rode, E. G. Gamaly, A. G. Christy, J. G. Fitz Gerald, S. T. Hyde, R. G. Elliman, B. Luther-Davies, A. I. Veinger, J. Androulakis, J. Giapintzakis, *Nature* (2004). This material was prepared by ablation of vitreous carbon in argon atmosphere with high-repetition and high-power laser.

Also U.S. Pat. No. 6,312,768 deals with this subject, describing a method of depositing thin films of amorphous and crystalline nanostructures based on the deposition of ultra-rapid laser pulses.

However, despite the existing developments, there is still the need for a process of preparing magnetic graphitic materials in any amount, provided with long-lasting magnetic properties at room temperature, said materials being prepared from graphite and transition metal oxides, both powdered and under reaction conditions that lead to the desired product. Such process and the associated graphitic product are described and claimed in the present application.

SUMMARY OF THE INVENTION

Speaking in a broad way, the invention deals with a process of preparing magnetic graphitic materials from pure graphite, said process comprising:
a) providing a reactor with a first container containing pure graphite and a second container containing one or more transition metal oxides, the graphite and the oxide(s) being finely divided, the containers being placed at great physical proximity, the volume ratio of graphite to transition metal oxide(s) being of about 1:1, the reaction system being closed, under pressure with values between high vacuum ($10^{-7}$ torr) to 10 atmospheres of an inert gas, and kept at temperatures between reaction beginning temperature and the melting temperature of the transition metal oxide(s) for 6 to 36 hours, whereby:
  i) the transition metal oxide, upon decomposing by action of the temperature, generates a proportion of oxygen gas sufficient to cause oxidative attach of the graphite and generating pores therein; and
  ii) the transition metal oxide is reduced, for the most part, to the null oxidation state, whereas the carbonous material at the end of the process presents two zones, the upper zone being constituted by the desired product, of porous structure, bunches, pilings, and edges of exposed graphenes;
b) at the end of the desired reaction time, recovering the graphitic material with long-lasting magnetic properties at room temperature.

Thus, the invention foresees a process for obtaining magnetic graphitic materials at room temperature from pure graphite and one or more transition metal oxides, said oxides being combined at any proportion, provided that the amount of graphite is in stoichiometric excess.

The invention also foresees a process for obtaining magnetic graphitic materials, the magnetism being detectable at room temperature, for example by attraction to a permanent magnet.

The invention also foresees a process for obtaining magnetic graphitic materials at room temperature, said process being accessible for commercial production without excessively sophisticated equipment or techniques, the objectives of the invention requiring only standard reactors like furnaces at 1200° C.

The invention also foresees a material purely based on carbon, capable of exhibiting the cited magnetic properties at room temperature.

The invention further foresees a stable magnetic graphitic material, that is to say, a material that maintains its properties for prolonged times, at least for a few weeks.

The invention also foresees a magnetic graphic material in which the required properties result from the topographic characteristics introduced in the original graphite.

DETAILED DESCRIPTION OF THE PREFERRED EMBODIMENTS

Therefore, the present process of obtaining a graphitic material having long-lasting magnetic properties at room temperature is basically an oxidative attack on pure graphite, originated from a proportion of oxygen from the decomposition, at a temperature between that of the beginning of the reaction of about 600° C. and the melting temperature of the oxide or mixture of metal transition oxides in a closed system and in the presence of a transfer inert gas.

Alternatively, the proportion of oxygen may be originated from oxygen gas in amounts equivalent to those obtained from the decomposition of the oxide or mixture of transition metal oxides.

Pure graphite is useful for the present process, which is commercially available. In order to facilitate contacting graphite with the oxidizing gas from the decomposition of the transition metal oxide, pure powdered graphite is used, which is held in a container inside a reactor in closed system, as will be detailed hereinafter. Typically, and by way of example, the use of graphite with granulometry smaller than 0.1 millimeters works adequately.

All the forms of pure graphite are useful for the process, as for example, pyrolytic graphite, powdered pure graphite, or any other variety or form of presentation of graphite.

The transition metal oxides useful for the process of the invention are a metal oxide of the VII group, as Fe, Co and Ni; metals of the IB group, such as Cu and of the IIB groups, as Zn; metals of the IIIB group, as Sc; metals of the IVB, as Ti and of the VB group, as V; metals of the VIB group, as Cr. A preferred transition metal oxide for the purposes of the invention is cupric oxide (CuO), either pure or combined with other oxides at any proportion.

The transition metal oxide is also used in powdered form. The oxide or mixtures thereof are placed in the container without the need to take precautions with regard to compacting it. Since the reaction is in vapor phase, the oxide used should have sufficient pureness to ensure that contaminant components will not volatize, this being the only requirement. Oxides of usual pureness used in laboratories work well.

Good results are achieved when a mixture of graphite with other elements is used for the reaction. By way of example, the mixture of graphite with boron up to about 10% by weight of boron produces the sought-for magnetic results.

According to the principles of the invention, the proportion of graphite should be stoichiometrically quite higher than that of transition metal oxide. However, if it is considered by volume, the volumes of the transition-metal-oxide powder and pure graphite powder may be at the ratio of 1:1 or very close to this, for better results.

The containers or melting pot used both for graphite and for metal oxide, and the furnace tube are built from alumina, without being limited to this material. Any material that bears process temperatures is suitable.

In a preferred embodiment, the containers have approximately 8 cm in length and 1 cm in width and height; the furnace tube has 2.5 cm in diameter and 96 cm in length. These dimensions are preferred for application on a workbench scale, the values and the proportion between them may be different for pilot scale or industrial scale.

The atmosphere of the closed system may consist of an inert gas used as transfer aid, which may be under pressures of up to 10 atmospheres, or else, under vacuum. A typical inert gas is nitrogen or argon, in a reasonable degree of pureness of, for example, 99.9%. No special recommendations are required for this gas in addition to the usual commercial characteristics.

During the reaction, a vacuum is made in order to help in displacing the balance of the reaction towards the products. The level of vacuum useful for the reaction is between the mechanical-pump vacuum (between $10^{-2}$ and $10^{-3}$ torr) and high vacuum ($10^{-7}$ torr).

The range of temperatures at which the reaction takes place is from 600° C. (a range in which the oxidation reaction begins) to, for instance, the melting temperature of the transition metal oxide (or of the mixture of transition metal oxides) chosen, or of this metal in the state of zero oxidation. Typically, for cupric oxide, 1200° C. has proved to be a very suitable temperature.

The reaction between graphite and transition metal oxide occurs during a few hours, between 6 and 36 hours, with the preferred range between 14 and 24 hours.

The process of the invention for preparing a magnetic graphitic material may be carried out in batches, as described, or alternatively in a continuous manner. In this way, any type of reactor/furnace capable of bearing high temperatures may be used.

According to the proposed process, the original graphite and the transition metal oxides being in separated containers at the end of the reaction, the transition metals are completely or for the most part reduced to its state of zero oxidation. For better results, the containers holding graphite and at least one transition metal oxide are very close to each other inside the reactor where the reaction takes place to form magnetic graphite. According to the invention, the proximity between the containers holding the reactants ranges from 0 to 100 mm, more preferably from 30 to 50 mm, and even mover preferably from 5 to 15 mm.

In the container where originally there was pure graphite, carbonous material is obtained, and it is possible to identify clearly two different zones. The material in the upper zone has an amorphous aspect, opaque color, and that in the lower zone has a crystalline aspect.

The material having magnetic properties at room temperature of the present invention is that of the upper zone, which, studied by scan electronic microscopy (SEM) and by atomic form microscopy (MFM), has a complex structure with pores, bunches, pilings and edges of exposed graphenes. On the contrary, the material in the lower zone does not have a magnetic behavior at room temperature. It is important to separate the magnetic and non-magnetic phases in order to achieve a purer and concentrated material, which may be carefully made due to the clearly different physical aspect of both phases, or else with the help of a magnet.

In addition to the mere detection of magnetism at room temperature by the use of an ordinary magnet, magnetic force microscopy (MFM) has also shown there is a magnetic behavior in the material of the upper zone, thus showing the important role that the topographic characteristics described play to bring about these properties. Magnetic measurements confirm this intense magnetic behavior exhibited by the material obtained by the process of the invention.

Without being linked to any particular theory, the behavior exhibited by the magnetic product of the reaction may be attributed to the interaction of orbitals $sp^3$ and $sp^2$, and to the location of streams of electrons that were displaced before in the orbitals $\pi$ of the graphenes. These electrons are forced to take a location, reaching the magnetic moment due to the microstructural variations introduced by this procedure. These electrons may form orbits located around the defects created. If, due to the relative arrangement in space between the material, many located orbits do not cancel each other, but rather add up, then they may produce a macroscopic magnetic moment, being capable of bringing about the effect described and claimed in the present application.

Figure 3:
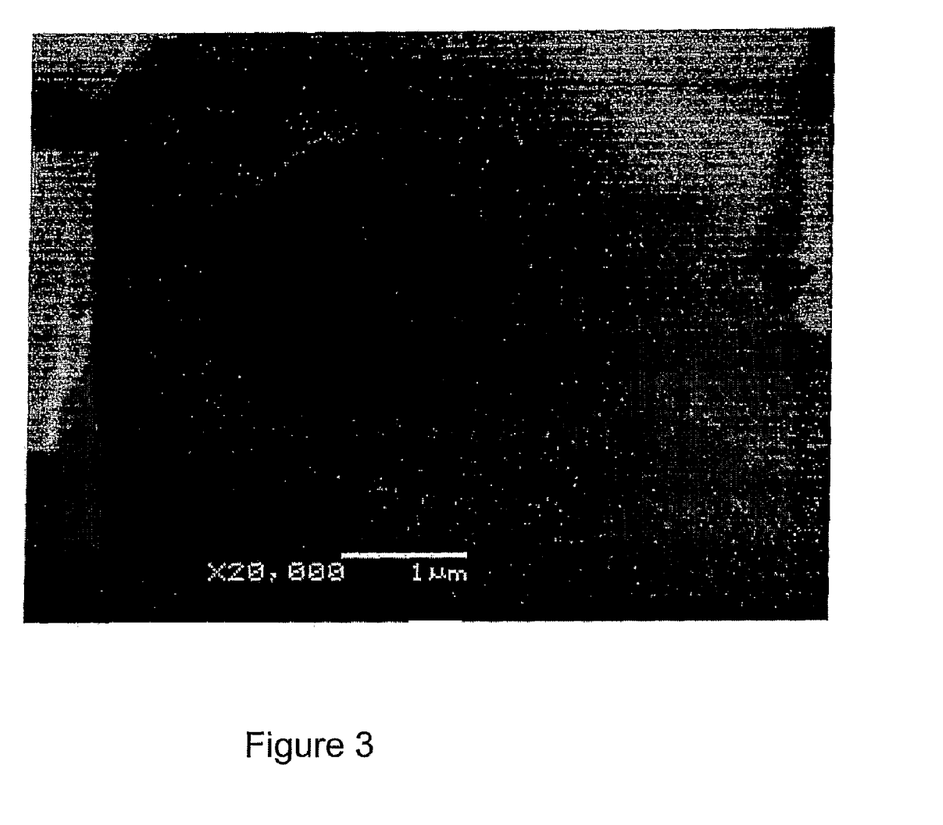
FIG. 3 illustrates a SEM image of the magnetic graphitic material obtained by the process of the invention.

Then SEM photograph illustrated in FIG. 3 clearly shows the propagation of pores through the different graphite blades, which is in accordance with this explanation. In other words, the idea is that, if we have pores passing through various consecutive graphenes, the streams of electrons $\pi$ that are located in the pores generate magnetic moments in the form of spires over each other, in the form of a solenoid overlapping its effects and giving a non-null net macroscopic magnetic moment.

The influence of metals for the existence of this magnetism has been dismissed by analysis of X-ray fluorescence and by dispersive energy spectroscopy (EDS), coupled to electronic scan microscopy. These studies are carried out on the original graphite, without processing, and on the modified graphite, no difference being noted between the results.

The magnetic graphite at room temperature produced by the present process is characterized by having complex microstructure, constituted by pores that pass through various graphite blades—with diameters ranging from a few nanometers to more than 1 $\mu m$ and nano and microstructured forms with the aspect of bunches or pilings. The structure of the graphite obtained can be seen in FIG. 2.

The invention will now be described with reference to the attached Figures.

Figure 1:
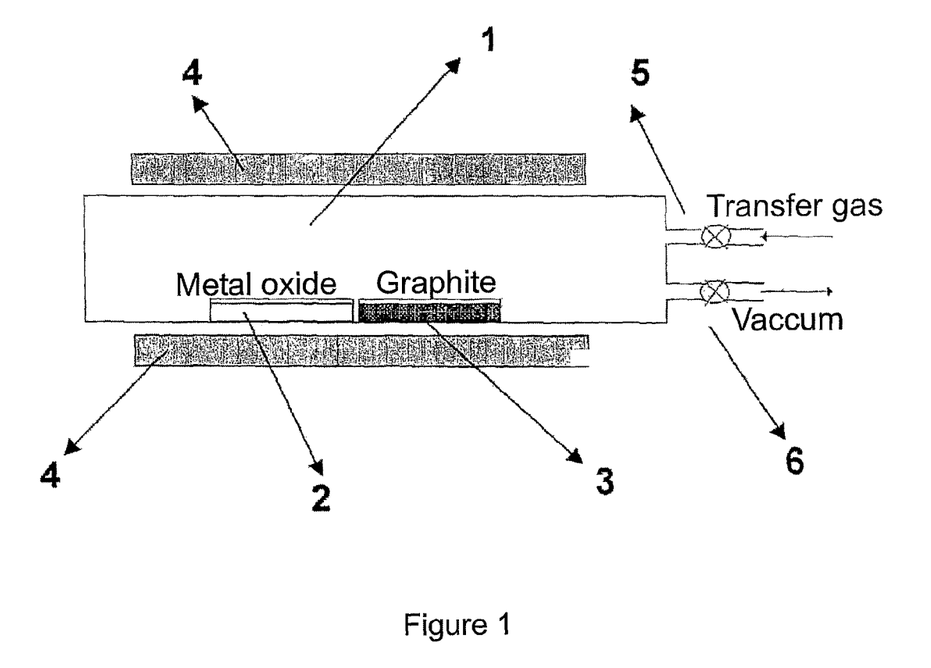
FIG. 1 illustrates a scheme of the reactor used in the process of the invention.

FIG. 1 is a simplified diagram of the reactor used in the process of the invention.

Basically the reactor (1) is a closed system, such as an hourglass, heated by a sleeve (4) or any heating device capable of supplying temperatures between 600° C. and the melting temperature of the transition metal oxide (or mixture of oxides). Inside the reactor (1), a first container (2) is placed containing the powdered transition metal oxide(s) described above, and very close to the first container (2), a second container (3) is placed containing powdered commercial pure graphite, at a ratio by volume in the first and second containers (2) and (3) being of 1:1. Through an inlet (5) a transfer inert gas, for example, nitrogen, is injected. Through the outlet (6), a vacuum is made in the system, which may vary from values obtained from mechanical pump (typically $10^{-2}$-$10^{-3}$ torr) to high vacuum ($10^{-7}$ torr).

When the system reaches temperatures suitable for generating oxygen gas from the transition metal oxide(s) contained in the first container (2), the oxidation of the graphitic material contained in the second container (3) begins and, consequently, the process of forming pores in the graphite as well. Since the reaction takes place during 6 to 36 hours, with a preferred period of time of 14 to 24 hours, the generation of pores in the powdered graphite may even produce spongy materials, if so desired.

At the end of the reaction the graphitic material of the upper part of the second container (3) is recovered as a product of the reaction, exhibiting long-lasting magnetic properties at room temperature.

The yield in magnetic graphitic product material ranges from 1/10 to 1/20 (by volume) of the graphite originally placed into the second container (3); by weight and by way of example, a reaction initiated with 5 grams of graphite produces approximately 0.25 grams of magnetic graphite.

Figure 2:
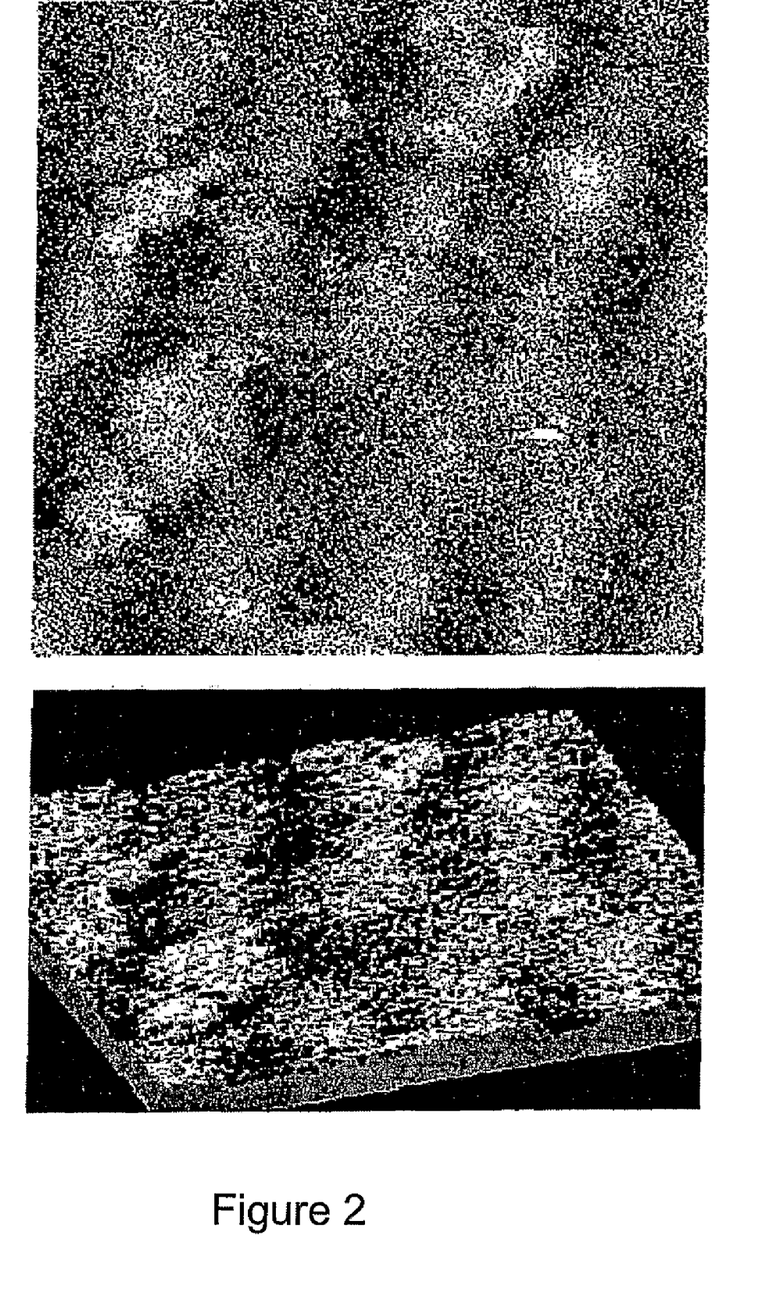
FIG. 2 illustrates an MFM-2D image and the corresponding 3D image, the total photographed area being of about 10 μm×10 μm, and wherein the width of each magnetic track is of about 1 micrometer.

FIG. 2 illustrates an image of magnetic force microscopy (MFM) of a graphite of the invention. The width of each magnetic track is of about 1 micrometer. The figure enables the verifying of the degree of structuration of the product obtained. This structure degree enables one to show that, at room temperature, the magnetic response of the material is important and with clearly established domains.

FIG. 3 is a SEM photograph of a graphitic material of the invention. In this photograph it can be observed that the degradation of the graphenes that gives rise to the pores mentioned before occurs successively in more internal blades, reinforcing the described effect and causing the claimed magnetic effect.

Figure 4:
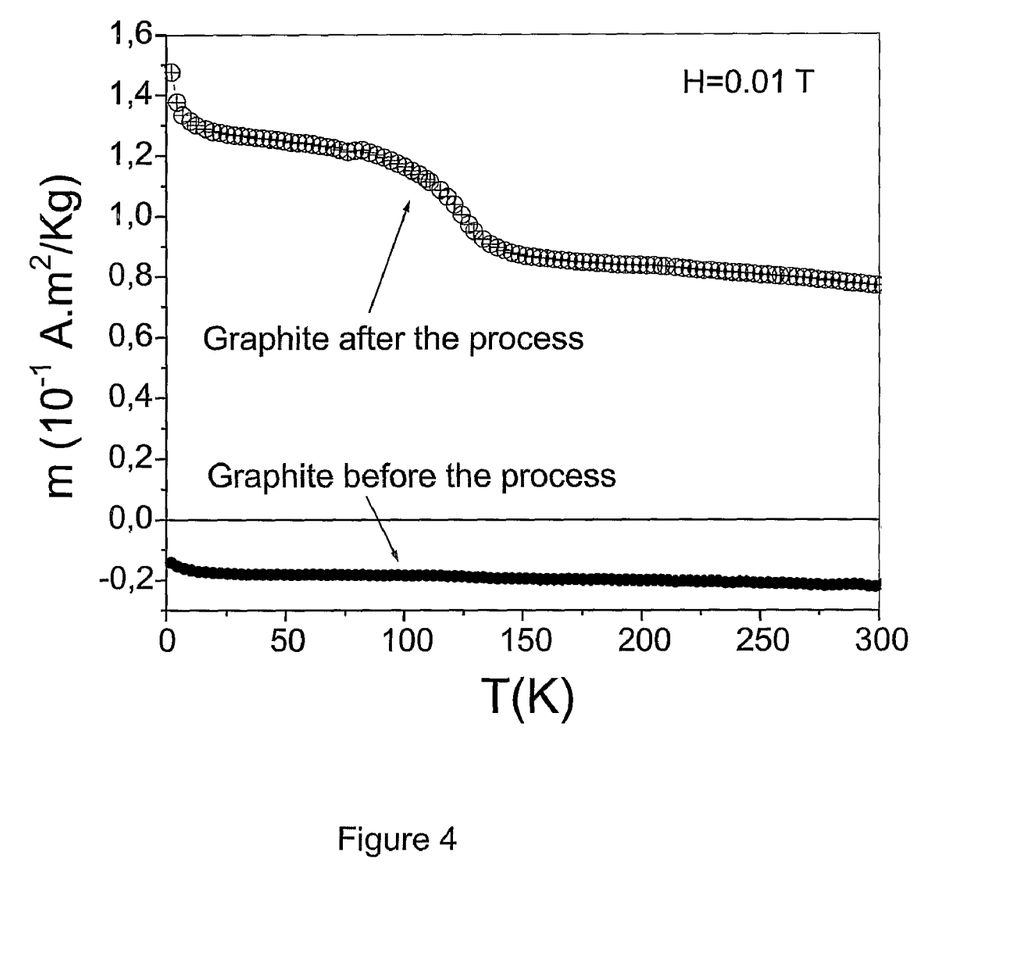
FIG. 4 is a graph illustrating the magnetization curve (SQUID) vs. temperature, comparing the magnetic behavior of the material before and after the process, for an applied external magnetic field of 0.01 T (1000 Oe).

FIG. 4 is a graph of the magnetization curve (SQUID) vs temperature, comparing the magnetic behavior of the material before and after the process. FIG. 4 enables one to verify the enhanced magnetic modification found in the graphitic material by the treatment of the proposed process. The achieved modification is very clear and enables the total reversion of the original diamagnetic bulk behavior of the graphite to a very intense ferromagnetic behavior. It enables one to infer this type of such an important response may not be attributed at all to the presence of impurities in the sample, since these impurities, if present, would permit, at best, to observe a weak, undermined magnetism, only perceptible by subtracting the diamagnetic background of the graphite bulk, which clearly does not happen in this case.

Figure 5:
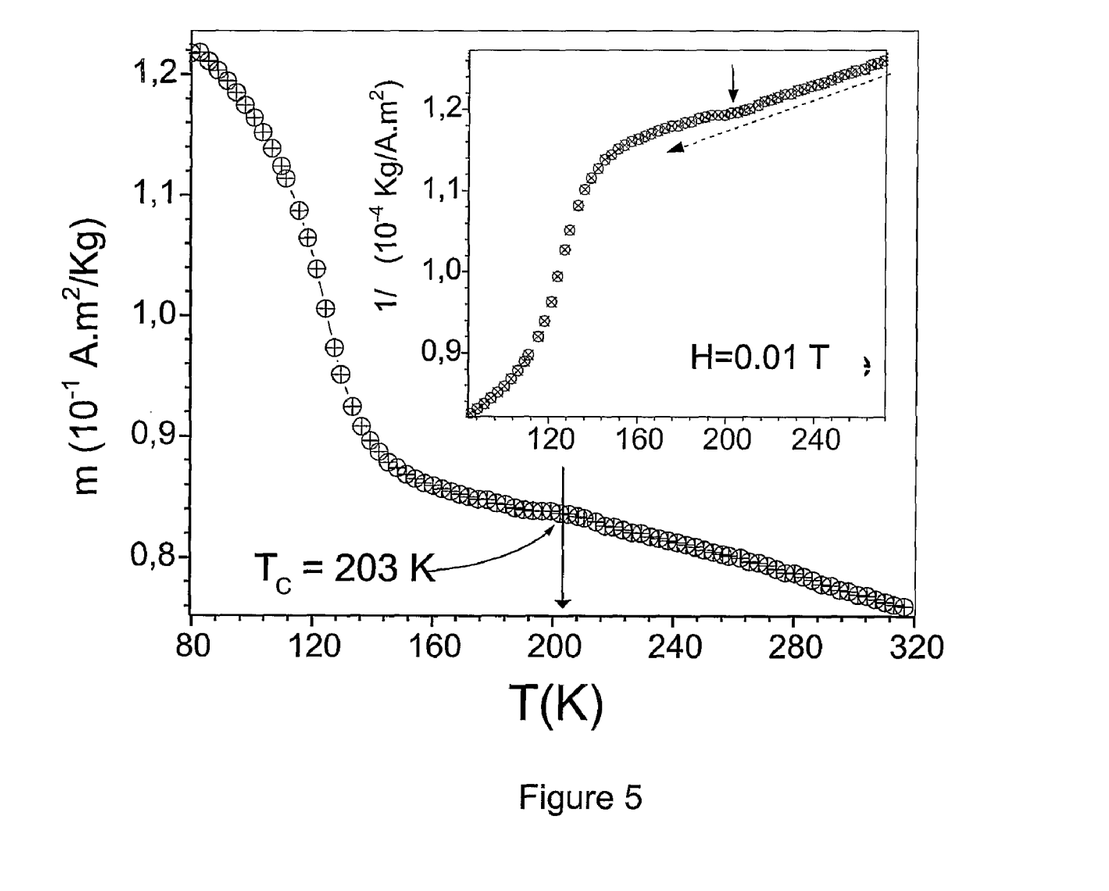
FIG. 5 is a graph showing a detail of the magnetization curve (SQUID) vs. temperature, for an applied external magnetic field of 0.01 T (1000 Oe), which shows the magnetic quality of the product obtained by the process of the invention. The insert shows a detail of the curve of the inverse of the magnetic susceptibility as a function of the temperature, and the determination of the Curie (Tc) temperature in approximately 200 K.

FIG. 5 is a graph that shows a detail of the magnetization curve (SQUID) vs. temperature, showing the magnetic quality of the graphitic material obtained, as well as the Curie temperature of about 185K. The magnetic behavior of the material persists even at room temperature.

Figure 6:
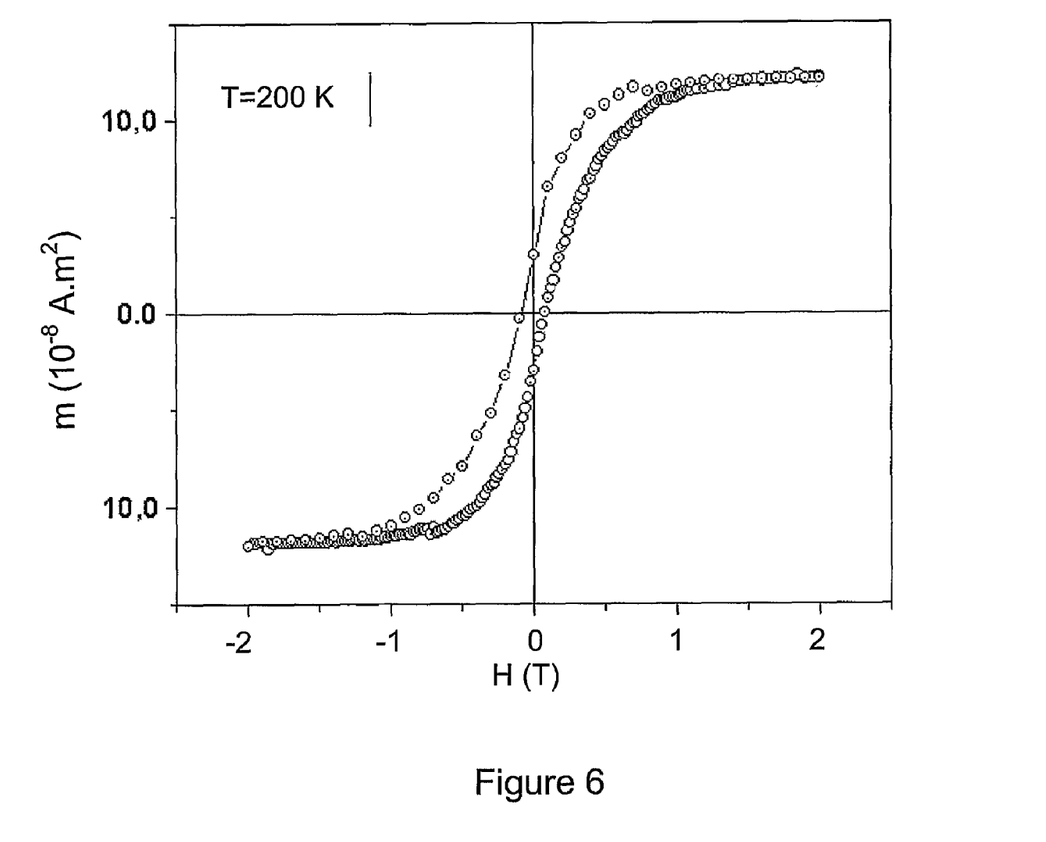
FIG. 6 is a graph showing the magnetization curve (SQUID) vs. external magnetic field, showing the typical behavior of a ferromagnet exhibited by the sample treated, in T=200K.

FIG. 6 is a graph that shows the magnetization curve (SQUID) vs. external field, showing that the graphitic product obtained by the process of the invention exhibits the typical behavior of a ferromagnet, at temperature of T=200K.

The above description proves, therefore, that it is possible to obtain macroscopic amounts of a material with long-lasting magnetic properties at room temperature from commercial pure graphite and a transition metal oxide under relatively mild conditions of reaction and with easily available equipment, and that the material thus obtained finds use in multiple applications, as magnetic image in medical science, or else applications in communications, electronics, sensors, even biosensors, catalysis or separation of magnetic materials.

Therefore, the present application presents a highly competitive process for obtaining magnetic carbon having physical properties hitherto unknown.

The invention claimed is:

1. A process of preparing magnetic graphitic materials, characterized by comprising the steps of:
   a) providing a reactor with a second container containing a material comprising graphite and a first container containing at least one transition metal oxide, the graphite and at least one transition metal oxide being finely divided, the first and second containers being placed in close physical proximity, the proportion by volume of graphite and at least one transition metal oxide being of about 1:1, wherein the reactor comprises a closed reaction system, under pressure with values from high vacuum ($10^{-7}$ torr) to 10 atmospheres, in the presence of an inert gas introduced through an inlet and vacuum made through an outlet, the reactor being kept at temperatures between a reaction start temperature of about 600° C. and a melting temperature of at least one transition metal oxide with the aid of heating devices for 6 to 36 hours, whereby:
   i) the transition metal oxide, upon decomposing by action of the temperature, generates a proportion of oxygen gas sufficient to cause oxidative attack on the graphite and generating pores therein; and
   ii) the transition metal oxide is reduced completely to the null oxidation state, whereas the material in the second container at the end of the process exhibits two zones, an upper zone thereof being constituted by a carbonaceous material having an amorphous aspect and magnetic properties at room temperature, the carbonaceous material having a structure having pores and edges of exposed graphenes, and a lower zone thereof being a non-magnetic phase;
   b) at the end of the desired reaction time, recovering the graphitic material with stable magnetic properties at room temperature.

2. A process according to claim 1, characterized in that the graphite is commercial powdered pure graphite.

3. A process according to claim 1, characterized in that the graphite is pyrolytic.

4. A process according to claim 1, characterized in that the graphite is any variety or form of presentation of graphite.

5. A process according to claim 1, characterized in that the granulometry of the graphite is smaller than 0.1 mm.

6. A process according to claim 1, characterized in that the graphite contains up to about 10% by weight of boron.

7. A process according to claim 1, characterized in that the transition metal oxide comprises metals of the VIII group, including Fe, Co and Ni; metals of the IB group, including Cu and of the IIB group, including Zn; metals of the IIIB group, including Sc; metals of the IVB group, including Ti and of the VB group, including V; metals of the VIB group, including Cr, either pure or combined at any proportion.

8. A process according to claim 7, characterized in that the transition metal oxide is cupric oxide, either pure or in mixture with other transition metal oxides at any proportion.

9. A process according to claim 1, characterized in that the reaction time ranges from 14 to 24 hours.

10. A process according to claim 1, characterized by presenting yield between 1/10 and 1/20 (by volume) of the graphite originally placed in the second container.

11. A process according to claim 1, characterized in that the magnetic graphitic material is recovered with the help of a magnet.

12. A magnetic graphitic material characterized by being obtained by the process as defined in any of claims 1 to 11.

13. A magnetic graphitic material according to claim 12, characterized by having complex microstructures, constituted by pores that pass through various graphite blades, with diameters ranging from a few nanometers to more than 1 μm and nano and micro-structured forms.

* * * * *